United States Patent [19]

Meginnis

[11] 3,957,359
[45] May 18, 1976

[54] SIGHT GLASS ASSEMBLY

[76] Inventor: Charles E. Meginnis, 529 1/2 Nancy St., Charleston, W. Va. 25302

[22] Filed: Jan. 23, 1975

[21] Appl. No.: 544,199

[52] U.S. Cl. .................................. 350/319; 73/331; 73/334
[51] Int. Cl.² ..................... G02B 27/02; G02B 7/00
[58] Field of Search .............. 350/319; 73/330, 331, 73/334; 220/82 A; 137/559

[56] References Cited
UNITED STATES PATENTS

| 3,307,400 | 3/1967 | Le Roy | 350/319 X |
| 3,438,539 | 4/1969 | Le Roy | 350/319 X |
| 3,438,540 | 4/1969 | Le Roy | 350/319 X |

*Primary Examiner*—Paul A. Sacher

[57] ABSTRACT

A sight glass assembly adapted to be mounted across an opening in a vessel containing a fluid, generally including a housing having an opening registerable with a vessel opening, means for mounting the housing on such a vessel when the housing opening is registered with the vessel opening, the housing opening having a frusto-conically shaped wall section, an annular lens holder mounted on the housing, and a lens having a peripheral side wall, mounted in the lens holder across the opening therein, the lens holder having a collet portion including a plurality of circumferentially spaced fingers having interior surfaces engagable with the peripheral side wall of the lens and exterior surfaces engagable with the frusto-conically shaped wall of the housing, the collet portion being urged into camming relation with the frusto-conically shaped wall section of the housing opening whereby the collet fingers are cammed laterally inwardly relative to the lens, placing the periphery of the lens in radial compression.

22 Claims, 5 Drawing Figures

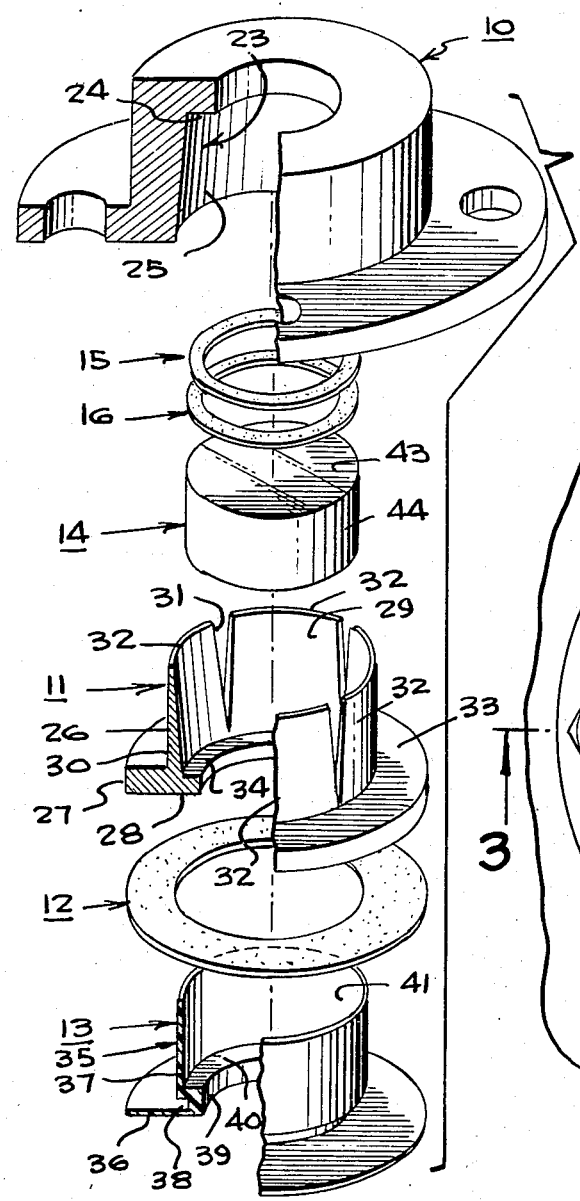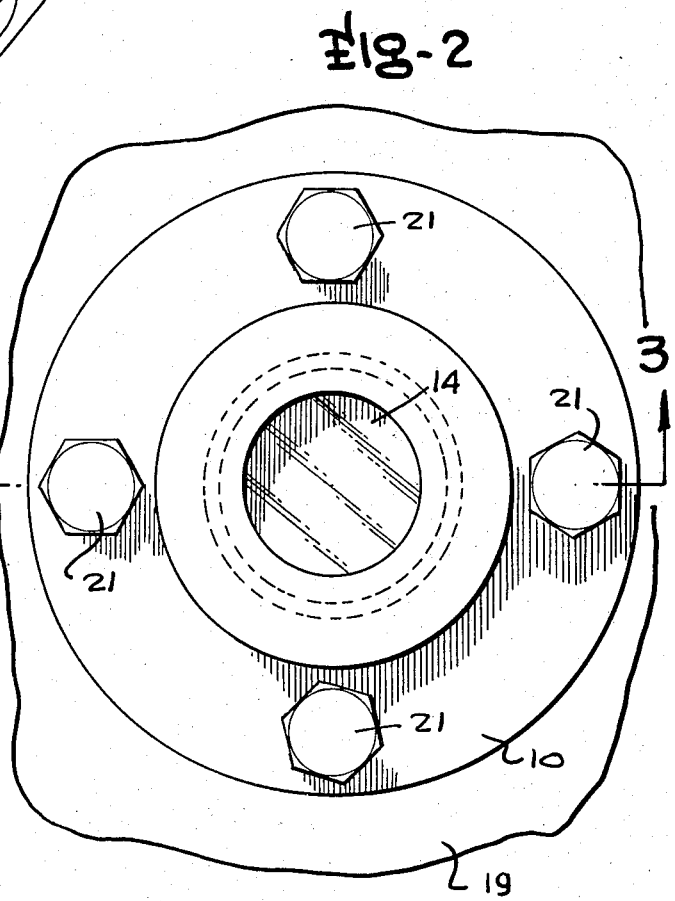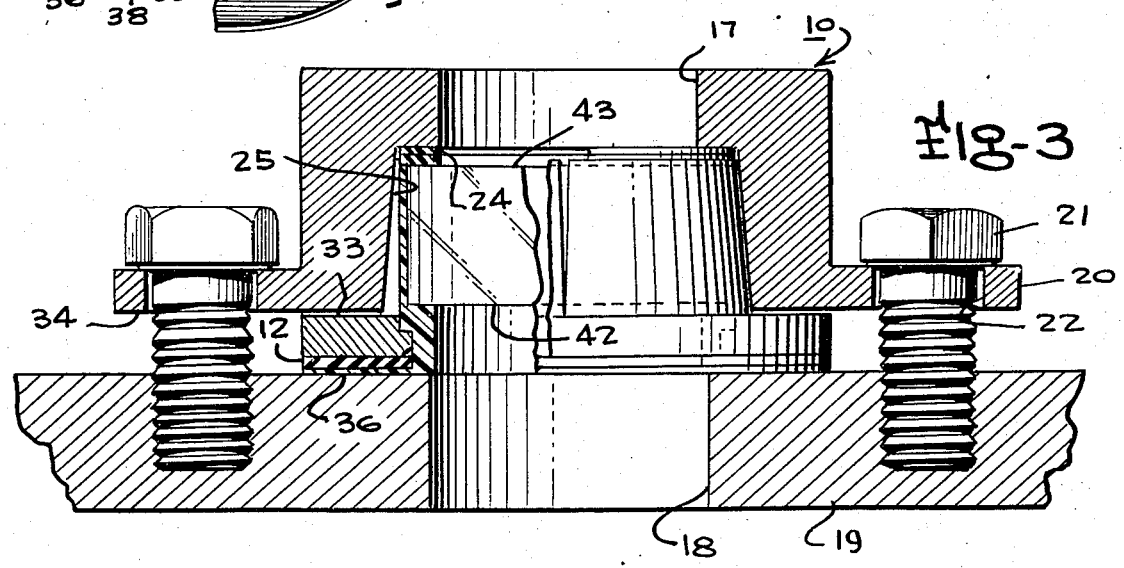

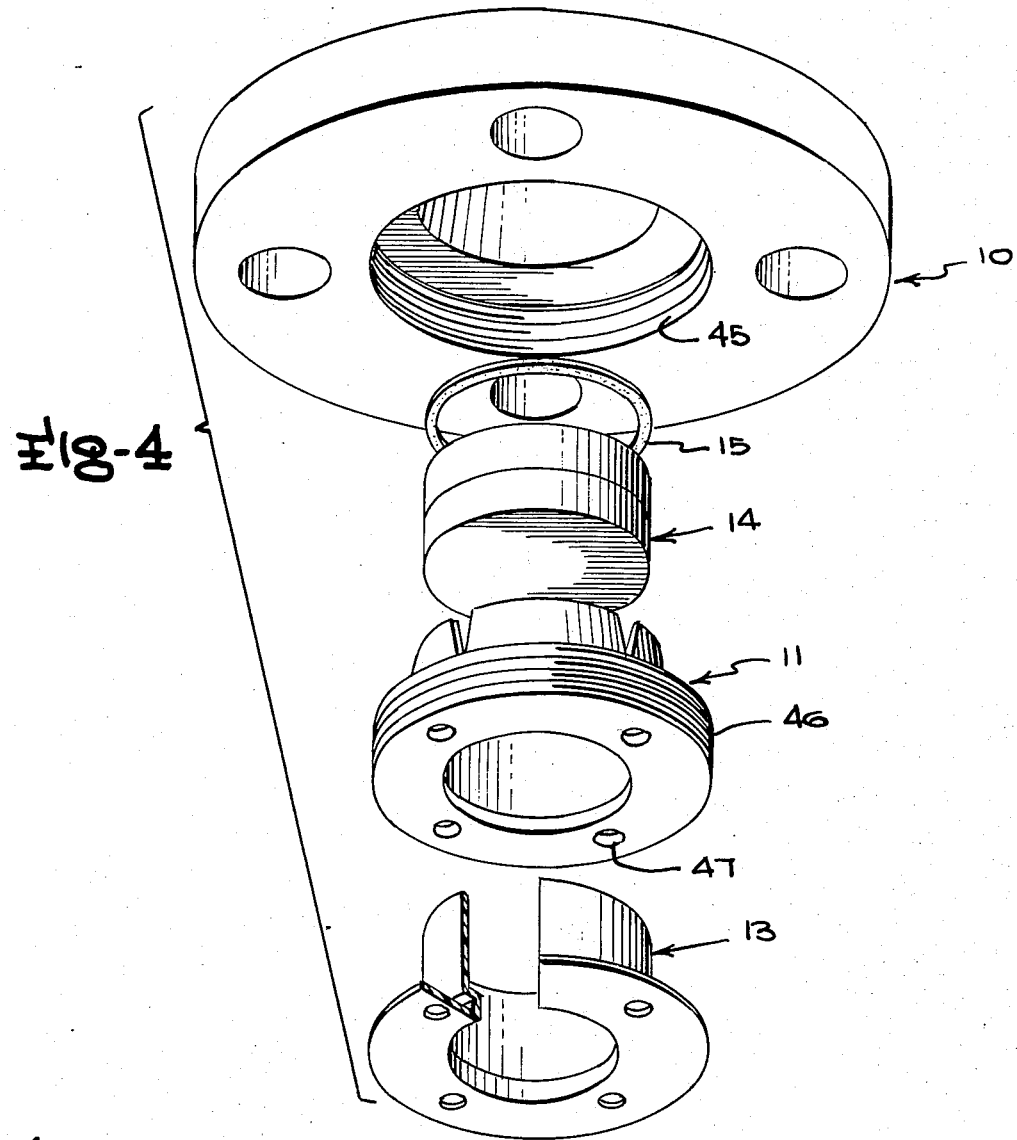
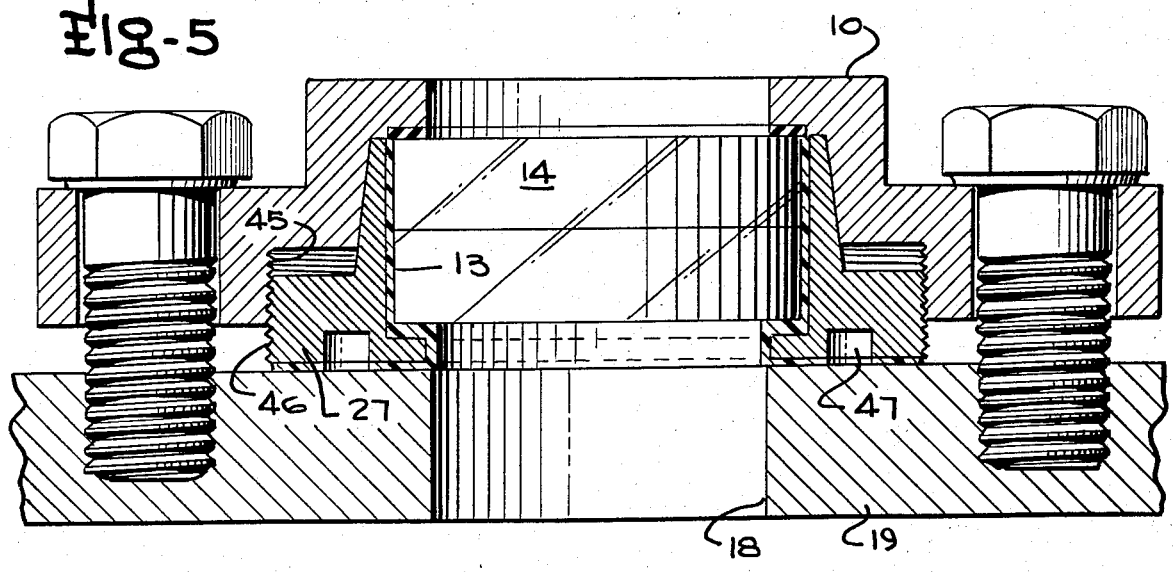

SIGHT GLASS ASSEMBLY

The present invention relates to a sight glass assembly and more particularly to a sight glass assembly suitable for use with large vessels containing fluids under pressure.

There has been developed in the prior art, a type of sight glass assembly which generally includes a housing having an opening therethrough which is adapted to be mounted across an opening in a pressure vessel, and a lens mounted in the opening of the housing. In this particular type of sight glass assembly, it has been found that the principal source of failure has consisted of fractures of the lens resulting in leakage and blowouts. Such cause of sight glass failure has been obviated to a large extent in prior art sight glass designs through the use of a packing member provided between the wall of the housing opening and the periphery of the lens, which packing is placed under compression causing it to expand laterally and correspondingly to place the lens in radial compression and form a fluid tight seal between the lens and the housing structure.

Often in the type of sight glass assembly as described, the packing member becomes corroded by virtue of its contact with other components of the assembly or the fluid within the vessel, thereby necessitating its replacement. It thus has been found to be desirable to provide a sight glass assembly generally of the type described which functions both to place the lens in radial compression and provide a fluid tight seal between the lens and the housing structure, wherein the packing member may be eliminated.

Accordingly, it is the principal object of the present invention to provide an improved sight glass assembly.

Another object of the present invention is to provide an improved sight glass assembly for use on vessels containing fluids under pressure.

A further object of the present invention is to provide a sight glass assembly in which the lens is placed in radial compression to prevent blowouts and to provide a fluid tight seal between the lens and the housing structure thereof.

A still further object of the present invention is to provide an improved sight glass assembly wherein the lens thereof is placed in radial compression and a fluid tight seal is provided between the lens and the housing structure therefor, which eliminates the necessity of a packing member between the periphery of the lens and the housing structure therefor, as provided in prior art designs.

Another object of the present invention is to provide an improved sight glass assembly including a minimum number of components which may be readily assembled and disassembled.

A further object of the present invention is to provide an improved sight glass assembly capable of placing the lens thereof in radial compression to prevent blowouts and form a fluid tight seal between the lens and the housing thereof, which can be more economical to manufacture and is more effective in performance and reliability.

Other objects and advantages of the present invention will become more apparent to those persons having ordinary skill in the art to which the present invention pertains, from the following description taken in conjunction with the accompanying drawing wherein:

FIG. 1 is a perspective view of an embodiment of the invention, illustrating the components thereof in exploded relation;

FIG. 2 is a top plan view of the embodiment illustrated in FIG. 1;

FIG. 3 is an enlarged cross-sectional view taken along line 3—3 in FIG. 2.

FIG. 4 is a perspective view of another embodiment of the invention, illustrating the components thereof in exploded relation; and FIG. 5 is an enlarge cross-sectional view of the FIG. 4 embodiment.

The embodiment illustrated in FIGS. 1 through 3 generally includes a housing 10, a lens holder 11, a gasket 12, a liner 13, a lens 14 and a pair of cushioning gaskets 15 and 16. Housing 10 generally has an annular configuration, providing an opening 17 adapted to register with an opening 18 in a wall 19 of a vessel containing a fluid. The housing is provided with an annular flange 20 and is adapted to be secured to the vessel wall by means of a plurality of bolts 21 extending through suitable openings 22 circumferentially spaced in flanged portion 20 of the housing, which are adapted to register with suitable threaded holes in the vessel wall. Housing opening 17 is provided with an enlarged section 23, as best illustrated in FIG. 1 which provides an annular shoulder 24 and a frusto-conically shaped side wall 25.

Lens holder 11 includes an annular portion 26, a radially outwardly projecting annular flange portion 27 and a radially inwardly projecting annular flange portion 28. Annular holder portion 26 includes an inner annular surface 29 and an outer frusto-conically shaped surface 30, and is provided with a plurality of circumferentially spaced, V-shaped recesses 31 defining a collet having a plurality of collet fingers 32. As shown in FIG. 3, the outer, inclined surfaces of collet fingers 32 are adapted to engage frusto-conically shaped side wall 25 of the housing structure which causes the collet fingers to be cammed radially inwardly. Also, as shown in FIG. 3, the dimension of annular portion 26 in an axial direction is less than the depth of enlarged section 25 of the housing opening so that when the lens holder is inserted in the housing, the upper end thereof will not be restricted by shoulder 24 prior to being cammed inwardly as a result of its engagement with side wall 25. It further is to be noted that flange portion 27 is provided with an outer annular surface 33 which normally is disposed adjacent an inner surface 34 of the housing when the lens holder is mounted in the housing. Furthermore, flange 27 restricts the insertion of the collet portion of the lens holder into the enlarged section of the housing opening. Flange portion 28 of the lens holder is provided with an annular seating surface 34 for supporting the peripheral portion of the inner surface of the lens when the lens is mounted in the lens holder, as later will be described.

Liner 13 includes an annular portion 35 and a radially outwardly projecting flange portion 36. Outer surface 37 of the annular portion is adapted to engage inner wall 29 of collet portion 26 and is provided with a recess 38 adjacent flange portion 36, for receiving flange portion 28 of the lens holder. Inner wall 39 of the liner also is recessed to provide an annular lens seating surface 40 and a lens side wall engaging surface 41. As best illustrated in FIG. 3, gasket 12 is interposed between the lens holder and liner flange portion 36.

Lens 14 is mounted in the center opening of the lens holder and is provided with an inner surface 42 seated about its periphery on annular surface 40 of the liner, an outer surface 43 which engages about its periphery, cushioning gasket 16, and a circular side surface 44 which engages inner surface 41 of the liner.

Since the housing would be shielded from any corrosive effects of the fluid contained within a vessel on which the assembly is mounted, it may be fabricated from any suitable material having sufficient strength characteristics, such as carbon steel. Lens holder 11, also being shielded from the fluid within the container by liner 13, similarly may be fabricated from any suitable material having sufficient strength characteristics. As a precaution, however, the lens holder may be fabricated of a material impervious to the effects of the fluid within the vessel, such as stainless steel or a similar suitable metal. Liner 13 is formed of a non-rigid, pliable or flexible material, impervious to the effects of the fluid within the vessel. The material should have sufficient strength to transmit a desired amount of compressive force applied by the collet fingers when they are cammed radially inwardly upon engagement with the frusto-conically shaped side wall of the housing, and yet resist rupture. TEFLON is an example of such a material.

In the assembly of the embodiment described, the housing first is positioned on its outer face and cushioning gaskets 15 and 16 are inserted in the enlarged section of the housing opening and seated on annular shoulder 24. The lens holder is then placed on its outer end and mounting gasket 12 is positioned on the upper end thereof. Liner 13 is then mounted on the lens holder by inserting the annular portion thereof through the opening of the lens holder and positioning the liner so that annular surface 37 engages inner surface 29 of the collet portion of the lens holder, angular flange 28 is received within recess 38 of the liner, and annular flange 36 engages and rests on mounting gasket 12. The lens holder is then inverted and restd on liner portion 36. Lens 14 is then inserted into the upper end of the lens holder and pressed downwardly until the periphery of inner surface 42 thereof rests on annular surface 34 of the liner and the circular side surface 44 thereof engages inner surface 41 of the liner. After the lens holder liner and lens have thus been subassemblied, the subassembly is inverted and inserted into the enlarged section of the housing opening. The subassembly is forced into the housing by any suitable means so that the collet fingers will engage the frusto-conically shaped wall of the enlarged section of the housing opening, and will be cammed radially inwardly to place the lens under an initial, radial compressive load.

The entire assembly is then mounted on the vessel well so that annular flange portion 36 of the liner circumvents opening 18 in the vessel wall and bolt holes 22 are registered wih the threaded holes in the vessel wall. Bolts 21 are then inserted through the flange openings, threaded into the holes in the vessel wall, and tightened. The tighting of bolts 21 will cause the lens holder to be inserted further into the enlarged section of the housing opening, thus causing the collet fingers to further be cammed radially inwardly, increasing the compressive load applied about the periphery of the lens. In this regard, it will be appreciated that the design of the assembly is such that no forces will be applied on the periphery of either of the inner or outer lens surfaces 42 and 43, and further that flange portion 27 of the lens holder will engage inner surface 34 of the housing to prevent an excessive radial force to be applied about the periphery of the lens.

In the embodiment as described, it will be noted that liner 13 functions not only to cushion and transmit the compressive force applied about the periphery of the lens, but further to shield both the housing and the lens holder from the corrosive effects of the fluid contained within the vessel.

The unit may be disassemblied essentially by reversing the procedure as described. Whenever it is desirable to repair or replace any of the components of the assembly, bolts 21 are removed to dismount the unit, and the subassembly consisting of the lens holder, liner and lens is free to be removed of the housing. After any of the components of the entire assembly have been repaired or replaced, the unit may be reassemblied as described and remounted on the vessel wall.

Although the subassembly of the aforementioned embodiment consisting of the lens holder, liner and lens, was described as being force-fit or press-fit into the housing, it is contemplated that other means may be employed to urge the collet fingers into camming relation with the frusto-conically shaped side wall of the housing opening to provide the compressive force about the periphery in the lens. In this regard, FIGS. 4 and 5 illustrate another embodiment of the invention which is essentially similar to the embodiment shown in FIGS. 1 through 3 with the exception of the means provided for urging the collet fingers into camming relation with the frusto-conically shaped side wall of the enlarged section of the housing opening. As illustrated in FIGS. 4 and 5, such means consists of an enlarged threaded section 45 in the housing opening, into which there is threaded flange portion 27 of the lens holder, provided with exterior threads 46. As best shown in FIG. 4, the lens holder further is provided with a plurality of circumferentially spaced openings 47 for receiving an appropriate tool for threading the lens holder with the liner and lens mounted thereon, into the enlarged section of the housing opening.

From the foregoing detailed description, it will be evident that there are a a number of changes, adaptations, and modifications of the present invention which come within the province of those persons skilled in the art. However, it is intended that all such variations not departing from the spirit of the invention be considered within the scope thereof as limited solely by the appended claims.

I claim:

1. A sight glass assembly adapted to be mounted across an opening in a vessel containing a fluid, comprising a housing having an opening registerable with said vessel opening, means for mounting said housing on said vessel when said housing opening is registered with said vessel opening, said housing opening having a frusto-conically shaped wall section, an annular lens holder mounted on said housing, and a lens having a peripheral side wall mounted in said lens holder across the opening in said holder, said holder having a collet portion including a plurality of circumferentially spaced fingers having interior surfaces engagable with the peripheral side wall of said lens and exterior surfaces engagable with said frusto-conically shaped wall section of said housing opening, said collet fingers being urged into camming relation with said frusto-conically shaped wall section of said housing opening whereby said collet fingers are cammed laterally inwardly toward said lens, placing the periphery of said lens in radial compression.

2. A sight glass assembly according to claim 1 including a liner formed of a non-rigid material interposed between the periphery of said lens and said lens holder.

3. A sight glass assembly according to claim 2 wherein said liner is formed of a material impervious to any corrosive effects of the fluid contained within the vessel on which the assembly is mounted.

4. A sight glass assembly according to claim 2 wherein said liner is formed of TEFLON.

5. A sight glass assembly according to claim 2 wherein said liner includes a portion interposed between said lens holder and said vessel opening when said assembly is mounted on said vessel wall.

6. A sight glass assembly according to claim 1 wherein said housing opening is provided with an enlarged section including said frusto-conically shaped wall section, providing a shoulder defining a bearing surface for the periphery of an outer end of said lens.

7. A sight glass assembly according to claim 6 including a cushioning gasket disposed between said shoulder and the periphery of the outer end of said sight glass.

8. A sight glass assembly according to claim 1 wherein said lens holder includes an annular surface defining a seating surface for the periphery of an inner end of said lens.

9. A sight glass assembly according to claim 1 wherein said lens holder includes an annular surface defining a seating surface for the periphery of an inner end of said lens, and including a liner formed of a non-rigid material interposed between the peripheral side wall and the periphery of the inner end of said lens and said lens holder.

10. A sight glass assembly according to claim 9 wherein said liner includes a portion interposed between said lens holder and said vessel opening when said assembly is mounted on said vessel wall.

11. A sight glass assembly according to claim 1 wherein said housing opening is provided with an enlarged section including said frusto-conically shaped side wall, providing a shoulder defining a bearing surface for the periphery of an outer end of said lens, said lens holder includes an annular surface defining a seating surface for the periphery of an inner end of said lens, and including a liner formed of a non-rigid material interposed between the peripheral side wall and the periphery of the inner end of said lens, and said lens holder.

12. A sight glass assembly according to claim 11 including a cushioning gasket interposed between the periphery of the outer end of said lens and said shoulder.

13. A sight glass assembly according to claim 11 wherein said lens holder is formed of a material impervious to the effects of any fluid contained within the vessel on which the assembly is mounted.

14. A sight glass assembly according to claim 11 wherein said liner includes a portion interposed between said lens holder and said vessel opening when said assembly is mounted on a vessel wall.

15. A sight glass assembly according to claim 11 wherein said liner includes a portion disposed between said lens holder and said vessel opening and a portion disposed between said lens holder and said vessel wall when said assembly is mounted on a vessel wall.

16. A sight glass assembly according to claim 1 wherein said lens holder is formed of a material impervious to the effects of any fluid contained within the vessel on which said assembly is mounted.

17. A slight glass assembly according to claim 1 wherein the collet portion of said lens holder is press-fit into said housing opening to urge said collet fingers into camming relation with said frusto-conically shaped side wall of said housing opening.

18. A sight glass assembly according to claim 17 wherein said lens holder includes a radially outwardly projecting flange portion which is engagable with an inner surface of said housing to restrict the insertion of said collet section into said housing opening.

19. A sight glass assembly according to claim 17 wherein said means for mounting said housing on said vessel wall includes a plurality of bolts inserted through a plurality of circumferentially spaced openings in said lens and threaded into registered openings in said vessel wall.

20. A sight glass assembly according to claim 18 wherein said flange is interposed between said housing structure and said vessel wall, and wherein said mounting means includes a plurality of circumferentially spaced openings in said housing and threaded into threaded openings in said vessel wall.

21. A sight glass assembly according to claim 1 wherein said housing opening includes an enlarged threaded section, and wherein said lens holder includes a threaded portion threaded into said enlarged threaded section of said housing opening whereby upon threading said lens holder into said housing, said collet fingers will be caused to engage said frusto-conically shaped side wall of said housing opening and be cammed inwardly to place the periphery of said lens in radial compression.

22. A sight glass assembly according to claim 21 wherein said means for mounting said housing on said vessel wall consists of a plurality of bolts inserted through openings in said housing and threaded into threaded openings in said vessel wall.

* * * * *